US 6,721,543 B1

(12) United States Patent
Katsura et al.

(10) Patent No.: US 6,721,543 B1
(45) Date of Patent: Apr. 13, 2004

(54) WIRELESS TERMINAL DEVICE

(75) Inventors: Takatoshi Katsura, Hyogo (JP); Kenji Itoh, Hyogo (JP); Shinjirou Fukuyama, Hyogo (JP); Mitsuru Mochizuki, Hyogo (JP); Hiroaki Nagano, Hyogo (JP); Yoshinori Matsunami, Hyogo (JP)

(73) Assignee: Mitsubishi Denki Kabushiki Kaisha (JP)

( * ) Notice: Subject to any disclaimer, the term of this patent is extended or adjusted under 35 U.S.C. 154(b) by 0 days.

(21) Appl. No.: 09/694,671

(22) Filed: Oct. 24, 2000

Related U.S. Application Data

(63) Continuation of application No. PCT/JP99/00831, filed on Feb. 24, 1999.

(51) Int. Cl.[7] .............................. H04Q 7/00; H04B 1/38
(52) U.S. Cl. ........................ 455/73; 455/562.1; 370/334
(58) Field of Search .................................. 455/101, 562, 455/561, 103, 105, 102, 78, 274, 277.1, 83, 73; 370/334; 375/229; 343/724, 852

(56) References Cited

U.S. PATENT DOCUMENTS

| | | | | |
|---|---|---|---|---|
| 4,361,905 A | * | 11/1982 | Etherington et al. | 333/1.1 |
| 5,276,914 A | * | 1/1994 | Ishizuka et al. | 455/83 |
| 5,477,532 A | * | 12/1995 | Hoshigami et al. | 370/277 |
| 5,822,684 A | * | 10/1998 | Kitakubo | 455/78 |
| 5,873,043 A | * | 2/1999 | Comer | 455/458 |
| 5,911,116 A | * | 6/1999 | Nosswitz | 455/83 |
| 5,987,308 A | * | 11/1999 | Ookita | 455/83 |
| 6,005,884 A | * | 12/1999 | Cook et al. | 375/132 |
| 6,021,318 A | * | 2/2000 | Schaffer | 455/78 |
| 6,115,585 A | * | 9/2000 | Matero et al. | 455/78 |
| 6,128,476 A | * | 10/2000 | Fujita | 455/101 |
| 6,226,275 B1 | * | 5/2001 | Yang et al. | 370/280 |
| 6,327,300 B1 | * | 12/2001 | Souissi et al. | 375/219 |
| 6,448,868 B2 | * | 9/2002 | Kato et al. | 333/103 |

FOREIGN PATENT DOCUMENTS

| | | |
|---|---|---|
| JP | 55-5624 | 1/1980 |
| JP | 60-124 | 1/1985 |
| JP | 61-23423 | 1/1986 |
| JP | 9-321655 | 12/1997 |
| WO | WO 90/10340 A1 | 9/1990 |

* cited by examiner

*Primary Examiner*—Sinh Tran
*Assistant Examiner*—S. Smith
(74) *Attorney, Agent, or Firm*—Rothwell, Figg, Ernst & Manbeck, P.C.

(57) ABSTRACT

A wireless terminal device includes a transmitting circuit, an isolator, a band pass filter, a switch, a transmitting antenna, a receiving circuit, a band pass filter, a switch, a receiving antenna, a high-pass filter, a low-pass filter and an input/output port. A transmission wave of a frequency is conveyed from the transmitting circuit to the input/output port via the isolator, the band pass filter and the low pass filter, and further to a vehicle antenna. Here, the transmission wave in the direction towards the receiving circuit is blocked by the high-pass filter. On the other hand, a reception wave of a frequency is conveyed from the vehicle antenna to the input/output port, and to the receiving circuit via the high-pass filter and the band pass filter. Here, the reception wave in the direction towards the transmitting circuit is blocked by the low-pass filter. Thus, transmission and reception can simultaneously be performed via a single input/output port, so that the wireless terminal device of the invention is compatible with a general wireless terminal device which performs simultaneous transmission/reception by one transmitting/receiving share antenna.

8 Claims, 2 Drawing Sheets

WIRELESS TERMINAL DEVICE

REFERENCE TO RELATED APPLICATION

This Application is a continuation of International Application No. PCT/JP99/00831, whose international filing date is Feb. 24, 1999, the disclosure of which is incorporated by reference herein.

BACKGROUND OF THE INVENTION

1. Field of the Invention

The present invention relates to a wireless terminal device of a system that simultaneously performs transmission and reception such as the CDMA (Code Division Multiple Access) system.

2. Description of the Background Art

In the terminal of a cellular phone employing the system that simultaneously performs transmission and reception such as the CDMA system, one antenna is often shared for transmission and reception. In this case, a transmission/reception branching filter is provided so as to convey a transmission wave from a transmitting circuit to the transmitting/receiving share antenna and to convey a reception wave from the transmitting/receiving share antenna to a receiving circuit, and also prevent the transmission wave from being conveyed to the receiving circuit. Furthermore, transmission and the reception may simultaneously be performed through an external connector, as in the case of a vehicle antenna to which the external connector is connected for use. In this case, the transmission/reception branching filter and an input/output port provided at the external connector are connected by a switch provided between the transmitting/receiving share antenna and the transmission/reception branching filter, so that the transmission wave is conveyed from the transmitting circuit to the vehicle antenna and the reception wave is passed from the vehicle antenna to the receiving circuit via the input/output port. Thus, transmission and reception are simultaneously performed via a single input/output port.

SUMMARY OF THE INVENTION

A wireless terminal device according to the invention corresponds to a system in which transmission and reception are simultaneously performed, and includes a transmitting circuit, a transmitting antenna, a receiving antenna, a receiving circuit, a single external input/output node and a transferring circuit. The transmitting circuit generates a transmission wave. The transmitting antenna emits the transmission wave outwards. The receiving circuit receives a reception wave from the receiving antenna. The transferring circuit transfers the transmission wave from the transmitting circuit to the external input/output node and transfers the reception wave from the external input/output node to the receiving circuit.

In the wireless terminal device, provision of the transferring circuit eliminates the necessity of providing the external input/output node corresponding to the transmitting and receiving circuits respectively. Transmission and reception can thus be simultaneously performed via the single external input/output node. Therefore, the wireless terminal device of the invention is compatible with a general wireless terminal device that simultaneously performs transmission and the reception by one transmitting/receiving shared antenna.

Preferably, the wireless terminal device of the invention further includes a first switching circuit and a second switching circuit. The first switching circuit is provided between the transmitting circuit and the transmitting antenna to selectively connect the transmitting circuit to the transmitting antenna or the transferring circuit. The second switching circuit is provided between the receiving circuit and the receiving antenna to selectively connect the receiving circuit to the receiving antenna or the transferring circuit.

According to the wireless terminal device, the transmission/reception by the transmitting/receiving antennas and the transmission/reception via the external input/output node can be switched selectively.

Preferably, the transferring circuit is a transmission/reception branching filter connected to the external input/output node, the transmitting circuit and the receiving circuit.

The transferring circuit preferably includes a first band pass filter and a second band pass filter. The first band pass filter is provided between the external input/output node and the first switching circuit to allow the transmission wave to pass therethrough and to block the reception wave. The second band pass filter is provided between the external input/output node and the second switching circuit to allow the reception wave to pass therethrough and to block the transmission wave.

According to the wireless terminal device of the invention, it is possible to suppress the transmission wave transferred from the transmitting circuit to the receiving circuit and the reception wave transferred from the external input/output node to the transmitting circuit.

The transferring circuit preferably includes a circulator. The circulator has a first terminal connected to the external input/output node, a second terminal connected to the second switching circuit, and a third terminal connected to the first switching circuit.

The circulator allows waves to pass therethrough in the direction from the first to the second terminals, from the second to the third terminals, and from the third to the first terminals, while blocking waves of the opposite direction therefrom. In other words, the circulator transfers the transmission wave from the transmitting circuit to the external input/output node and the reception wave from the external input/output node to the receiving circuit, while suppressing the transmission wave transferred from the transmitting circuit to the receiving circuit and the reception wave transferred from the external input/output node to the transmitting circuit.

Preferably, the wireless terminal device further includes a band pass filter provided between the second switching circuit and the receiving circuit to allow the reception wave to pass therethrough and block the transmission wave.

Preferably, the wireless terminal device further includes a band pass filter provided between the first switching circuit and the transmitting circuit to allow the transmission wave to pass therethrough and block the reception wave.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
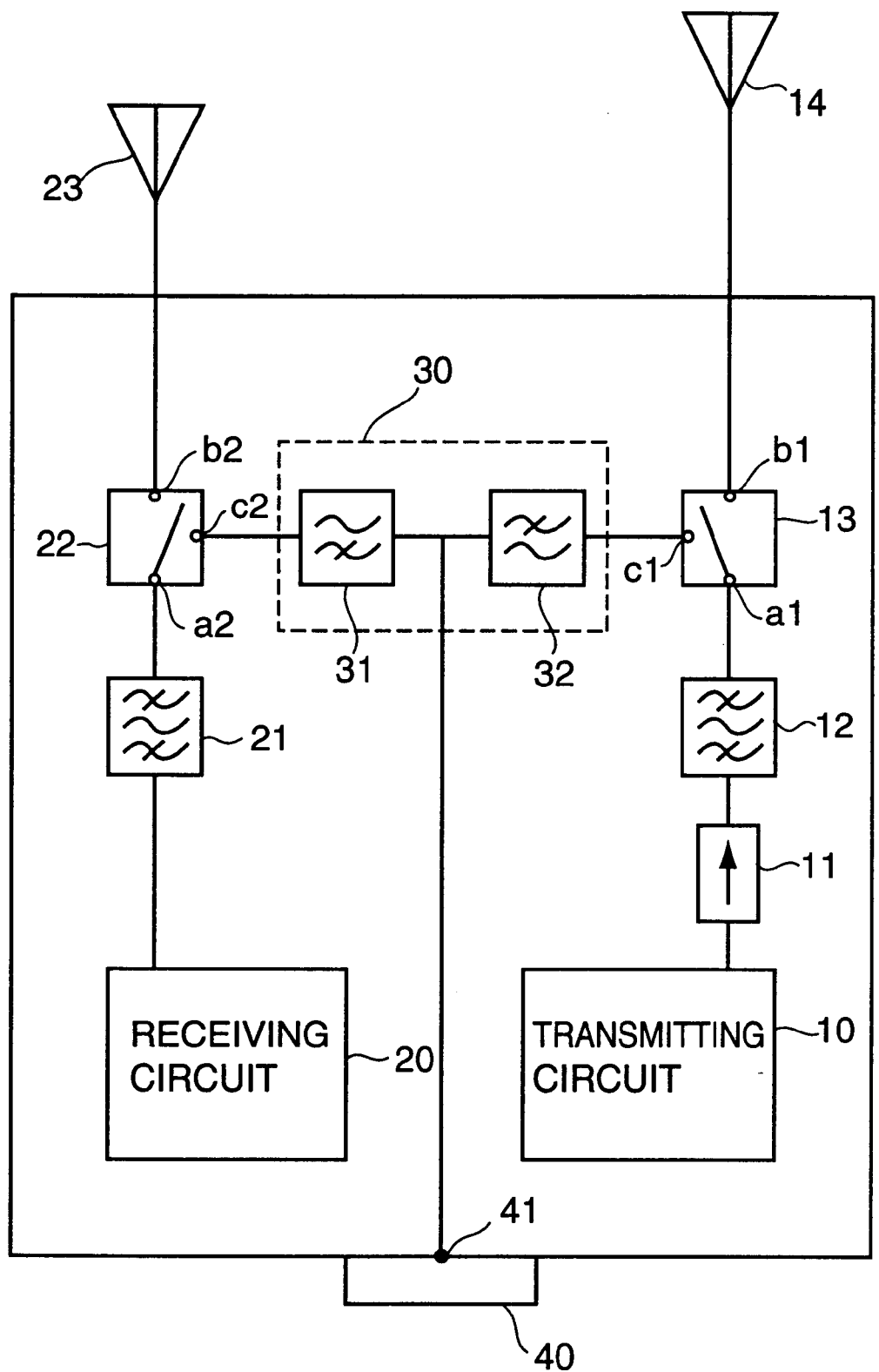
FIG. 1 is a block diagram illustrating an arrangement of the wireless terminal device of the first embodiment.

Embodiments of the invention will be described below with reference to the drawings. It is noted that the same or identical portion in the drawings is denoted by the same reference character and the description thereof will not be repeated.

FIRST EMBODIMENT

FIG. 1 is a block diagram illustrating an arrangement of the wireless terminal device according to the first embodiment of the invention. Referring to FIG. 1, the wireless terminal device includes a transmitting circuit 10, an isolator 11, a band pass filter 12, a switch 13, a transmitting antenna 14, a receiving circuit 20, a band pass filter 21, a switch 22, a receiving antenna 23, a transmission/reception branching filter 30, and an external connector 40. Transmitting circuit 10 generates the transmission wave of a frequency f1. Isolator 11 is provided between transmitting circuit 10 and band pass filter 11, and blocks the transmission wave reflected at transmitting antenna 14 back to transmitting circuit 10. Band pass filter 12 allows the transmission wave of frequency f1 to selectively pass through. Switch 13 includes a terminal a1 connected to band pass filter 12, a terminal b1 connected to transmitting antenna 14, and a terminal c1 connected to transmission/reception branching filter 30, and selectively connects terminal a1 to terminal b1 or c2. Transmitting antenna 14 outputs the transmission wave from the transmitting circuit 10. Receiving antenna 23 receives the reception wave of a frequency f2. It is noted that frequency f2 of the reception wave is herein set higher than frequency f1 of the transmission wave. It is further noted that frequency f1 is also referred to as a transmission frequency and frequency f2 is also referred to as a reception frequency. Switch 22 includes a terminal a2 connected to band pass filter 21, a terminal b2 connected to receiving antenna 23, and a terminal c2 connected to transmission/ reception branching filter 30, and selectively connects terminal a2 to terminal b2 or c2. Band pass filter 21 allows the reception wave of frequency f2 to selectively pass through. Receiving circuit 20 receives the reception wave of frequency f2. External connector 40 includes an input/output port 41. Transmission/reception branching filter 30 includes a high-pass filter 31 and a low-pass filter 32. High-pass filter 31 is provided between terminal c2 of switch 22 and input/output port 41 of external connector 40 to allow the reception wave of frequency f2 to pass through and to block the transmission wave of frequency f1. Low-pass filter 32 is provided between terminal c1 of switch 13 and input/output port 41 of external connector 40 to allow the transmission wave of frequency f1 to pass through and to block the reception wave of frequency f2.

The operation of the wireless terminal device configured as above is now described.

When the transmission and the reception are performed by transmitting antenna 14 and receiving antenna 23, terminals a1 and b1 are connected by switch 13 and terminals a2 and b2 are connected by switch 22. The transmission wave of frequency f1 is conveyed from transmitting circuit 10 via isolator 11 and band pass filter 12 to transmitting antenna 14 to be output. The reception wave of frequency f2 is received and conveyed to receiving circuit 20 via band pass filter 21. Thus, the transmission and the reception are simultaneously performed.

In general, at least the frequencies of transmission and reception are separated from each other at the time of simultaneous transmission and reception. Thus, it is difficult for one antenna to satisfy sufficiently the characteristics in each of a plurality of bands. Antennas respectively dedicated for the transmission and the reception are therefore individually provided.

The size of the transmission/reception branching filter of the wireless terminal device performing such simultaneous transmission/reception is determined depending on the degree of isolation required between the transmission and reception. Thus, the reduction of the amount of the isolation between the transmission and reception means the reduction of the size of transmission/reception branching filter 30. By separating the antennas, transmitting antenna 14 and receiving antenna 23 will have a certain isolation therebetween. The performance required for band pass filters 12, 21 to ensure the isolation between transmitting circuit 10 and receiving circuit 20 can thereby be lightened by the amount of the isolation between the antennas. As a result, the size of transmission/reception branching filter 30 can be reduced.

When the transmission/reception are to be performed via external connector 40, for example, in the case used in an automobile, external connector 40 is connected to a vehicle antenna. In this case, terminals a1 and c1 are connected by switch 13 and terminals a2 and c2 are connected by switch 22.

The transmission wave of frequency f1 is conveyed from transmitting circuit 10 via isolator 11, band pass filter 12 and low-pass filter 32 to input/output port 41, and further to the vehicle antenna. Here, the transmitting wave in the direction towards receiving circuit 20 is blocked by high-pass filter 31. On the other hand, the reception wave of frequency f2 is conveyed from the vehicle antenna to input/output port 41 and to receiving circuit 20 via high-pass filter 31 and band pass filter 21. Here, the reception wave towards transmitting circuit 10 is blocked by low-pass filter 32. Thus, the transmission and the reception are simultaneously performed via the single input/output port 41.

Further, the performance required for transmission/ reception branching filter 30 to ensure the isolation between transmitting circuit 10 and receiving circuit 20 is required to be about the same degree as the isolation between transmitting antenna 14 and receiving antenna 23.

As described above, provision of switch 13, 21, transmission/reception branching filter 30 and external connector 40 in the first embodiment allow transmission and reception to be effected simultaneously via single input/ output port 41. Therefore, the wireless terminal device of the invention is compatible with the wireless terminal device of the system that simultaneously performs transmission and reception by one transmitting/receiving share antenna.

SECOND EMBODIMENT

Figure 2:
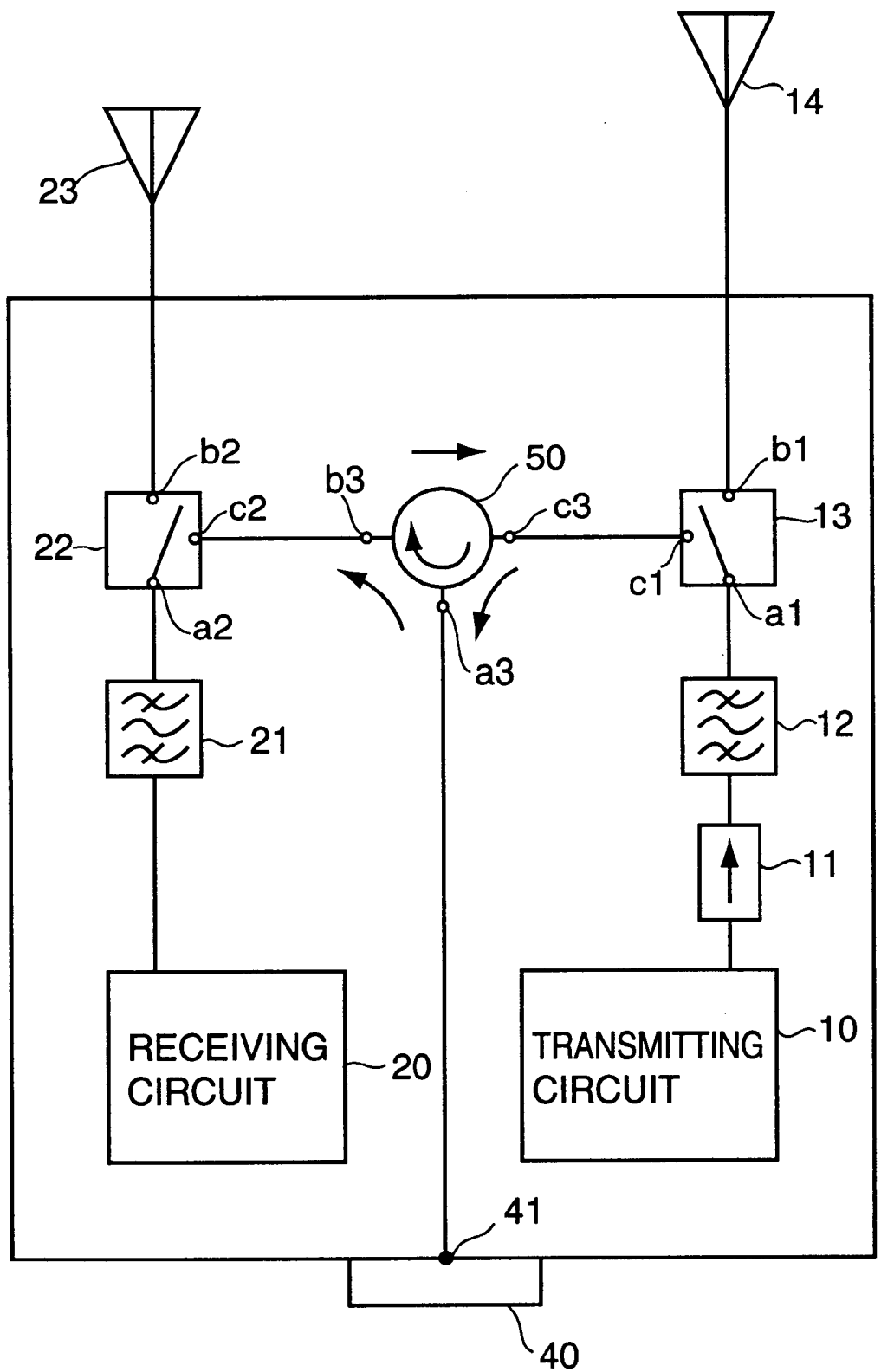
FIG. 2 is a block diagram illustrating an arrangement of the wireless terminal device of the second embodiment.

FIG. 2 is a block diagram illustrating an arrangement of the wireless terminal device according to the second embodiment of the invention. Referring to FIG. 2, the wireless terminal device is provided with a circulator 50 instead of transmission/reception branching filter 30 shown in FIG. 1. Circulator 50 includes terminals a3, b3 and c3. The terminals a3, b3 and c3 are respectively connected to input/output port 41, terminal c2 of switch 22, and terminal c1 of switch 13. Circulator 50 allows waves in the direction from terminals a3 to b3, from terminals b3 to c3, and from terminals c3 to a3 to pass through, while blocking waves in the opposite direction therefrom. Therefore, the transmission wave from transmitting circuit 10 is conveyed to input/ output port 41, and the reception wave from input/output port 41 is conveyed to receiving circuit 20. Further, the transmission wave from transmitting circuit 10 to receiving circuit 20 and the reception wave from input/output port 41 to transmitting circuit 10 are blocked. Therefore, the effect similar to that described in the first embodiment can be attained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wireless terminal device simultaneously performing transmission and reception, comprising:

a transmitting circuit generating a transmission wave;

a transmitting antenna emitting said transmission wave outwards;

a receiving antenna separate from said transmitting antenna;

a receiving circuit receiving a reception wave from said receiving antenna;

a single external input/output node; and a transferring circuit for transferring the transmission wave from said transmitting circuit to said external input/output node while blocking the reception wave from entering said transmitting circuit and transferring the reception wave from said external input/output node to said receiving circuit while blocking the transmission wave from entering said receiving circuit.

2. The wireless terminal device according to claim 1, further comprising:

a first switching circuit provided between said transmitting circuit and said transmitting antenna to selectively connect said transmitting circuit to said transmitting antenna or said transferring circuit; and a second switching circuit provided between said receiving circuit and said receiving antenna to selectively connect said receiving circuit to said receiving antenna or said transferring circuit.

3. The wireless terminal device according to claim 2, wherein said transferring circuit comprises:

a first band pass filter provided between said external input/output node and said first switching circuit to allow said transmission wave to pass therethrough and block said reception wave; and a second switching circuit provided between said receiving circuit and said receiving antenna to selectively connect said receiving circuit to said receiving antenna or said transferring circuit.

4. The wireless terminal device of claim 3, wherein said first band pass filter is a low-pass filter; and said second band pass filter is a high-pass filter.

5. The wireless terminal device according to claim 2, wherein said transferring circuit includes a circulator having a first terminal connected to said external input/output node, a second terminal connected to said second switching circuit, and a third terminal connected to said first switching circuit.

6. The wireless terminal device according to claim 2, further comprising:

a band pass filter provided between said second switching circuit and said receiving circuit to allow said reception wave to pass therethrough and block said transmission device.

7. The wireless terminal device according to claim 2, further comprising:

a band pass filter provided between said first switching circuit and said transmitting circuit to allow said transmission wave to pass therethrough and block said reception wave.

8. The wireless terminal device according to claim 1, wherein said transferring circuit includes a transmission/reception branching filter connected to said external input/output node, said transmitting circuit and said receiving circuit.

* * * * *